US009269524B1

(12) United States Patent
Le Galloudec

(10) Patent No.: US 9,269,524 B1
(45) Date of Patent: Feb. 23, 2016

(54) 3D TARGET ARRAY FOR PULSED MULTI-SOURCED RADIOGRAPHY

(71) Applicant: Sandia Corporation, Albuquerque, NM (US)

(72) Inventor: Nathalie Joelle Le Galloudec, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 192 days.

(21) Appl. No.: 14/154,289

(22) Filed: Jan. 14, 2014

(51) Int. Cl.
*H05G 2/00* (2006.01)
*H01J 27/24* (2006.01)
*G21B 1/19* (2006.01)
*H01J 35/08* (2006.01)

(52) U.S. Cl.
CPC ..................... *H01J 35/08* (2013.01)

(58) Field of Classification Search
CPC ......... H05G 2/001; H05G 2/008; H05G 2/00; H01J 27/24; G21B 1/19; G21B 1/23
USPC ............ 250/423 P, 505.1; 378/124, 143, 119; 372/108, 25, 5, 9
See application file for complete search history.

(56) References Cited

U.S. PATENT DOCUMENTS

| | | | | |
|---|---|---|---|---|
| 4,630,274 A * | 12/1986 | Schafer | ............. | B23K 26/0635 359/721 |
| 5,629,970 A * | 5/1997 | Woodruff | ............. | H01J 35/105 378/127 |
| 7,555,102 B1 * | 6/2009 | Renard-Le Galloudec | ........... | A61B 5/0091 378/124 |
| 8,229,075 B2 * | 7/2012 | Cowan | .................... | G21B 1/19 378/119 |
| 8,530,852 B2 * | 9/2013 | Le Galloudec | ........... | H01J 1/13 250/423 P |
| 2003/0108155 A1 * | 6/2003 | Wilkins | .................. | H01J 35/08 378/119 |
| 2004/0208285 A1 * | 10/2004 | Freudenberger | ..... | A61N 5/1001 378/119 |
| 2011/0147607 A1 * | 6/2011 | Galloudec | .............. | H01J 27/24 250/396 R |
| 2014/0030542 A1 * | 1/2014 | Adams | .................... | G21B 1/19 428/603 |

OTHER PUBLICATIONS

J. Davis, et al., "Angular distribution of neutrons from high-intensity laser—target interactions", Plasma Physics Controlled Fusion 50, pp. 1-16, (2008).
G. M. Petrov, et al., "Generation of high-energy (>15 MeV) neutrons using short pulse high intensity lasers", Physics of Plasmas 19, 093106, pp. 1-9, (2012).
D. P. Higginson, et al., "Laser generated neutron source for neutron resonance spectroscopy", Physics of Plasmas 17, 100701, pp. 1-4 (2010).

(Continued)

*Primary Examiner* — David A Vanore
(74) *Attorney, Agent, or Firm* — Medley, Behrens & Lewis LLC

(57) ABSTRACT

The various technologies presented herein relate to the generation of x-rays and other charged particles. A plurality of disparate source materials can be combined on an array to facilitate fabrication of co-located mixed tips (point sources) which can be utilized to form a polychromatic cloud, e.g., a plurality of x-rays having a range of energies and or wavelengths, etc. The tips can be formed such that the x-rays are emitted in a direction different to other charged particles to facilitate clean x-ray sourcing. Particles, such as protons, can be directionally emitted to facilitate generation of neutrons at a secondary target. The various particles can be generated by interaction of a laser irradiating the array of tips. The tips can be incorporated into a plurality of 3D conical targets, the conical target sidewall(s) can be utilized to microfocus a portion of a laser beam onto the tip material.

20 Claims, 5 Drawing Sheets

(56) References Cited

OTHER PUBLICATIONS

N. Le Galloudec, et al., "Guiding, Focusing, and Collimated Transport of Hot Electrons in a Canal in the Extended Tip of Cone Targets", Physical Review Letters 102, 205003, pp. 1-4, (2009).

D. P. Higginson, et al., "Production of neutrons up to 18 MeV in high-intensity, short-pulse laser matter interactions", Physics of Plasmas 18, 100703, pp. 1-4 (2011).

D. Jung, et al., "Characterization of a novel, short pulse laser-driven neutron source", Physics of Plasmas 20, 056706, pp. 1-9 (2013).

M. Roth, et al., "Bright Laser-Driven Neutron Source Based on the Relativistic Transparency of Solids", Physical Review Letters 110, 044802, pp. 1-5, (2013).

Y. Sentoku, et al., "Laser light and hot electron micro focusing using a conical target", Physics of Plasmas, vol. 11, No. 6, pp. 3083-3087, (2004).

T. Nakamura, et al., "Optimization of cone target geometry for fast ignition", Physics of Plasmas 14, 103105, pp. 1-7 (2007).

\* cited by examiner

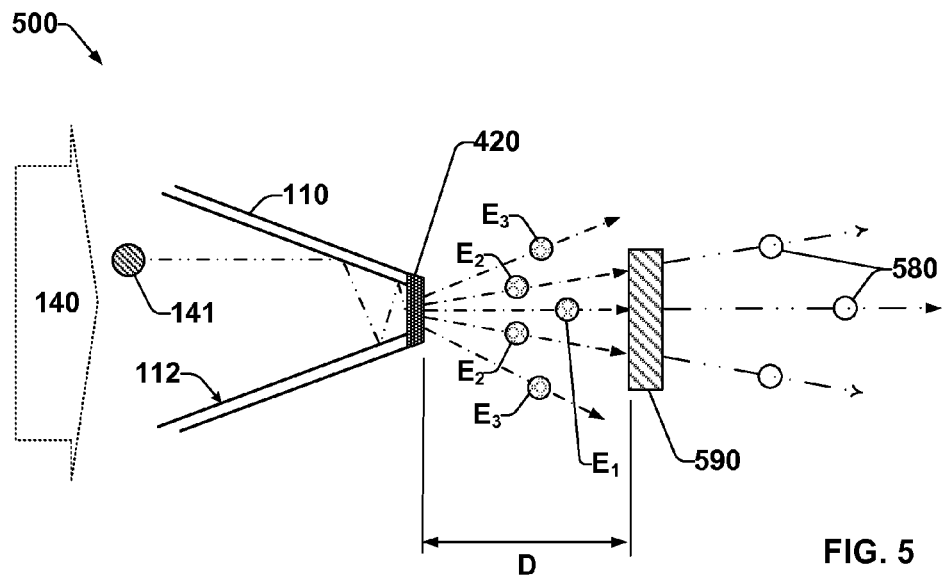
FIG. 5
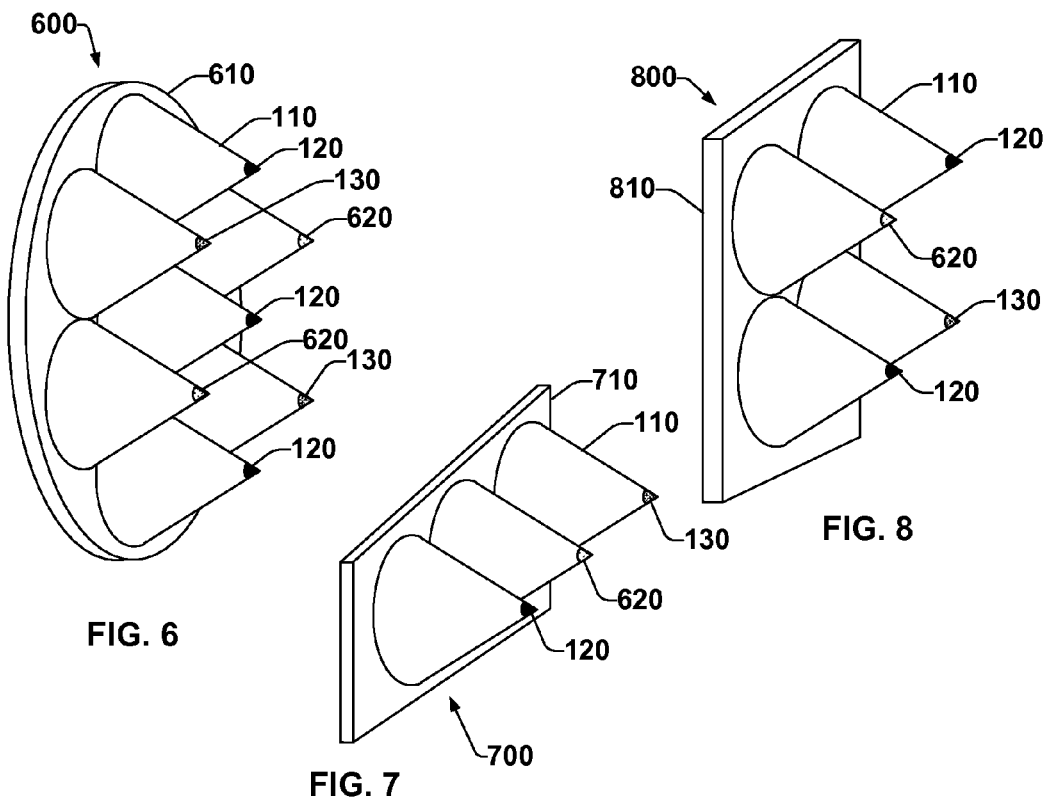
FIG. 6
FIG. 7
FIG. 8

3D TARGET ARRAY FOR PULSED MULTI-SOURCED RADIOGRAPHY

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Advances in laser technologies have enabled construction of laser sources which can be utilized in high energy physics applications. A laser beam can irradiate a target to facilitate generation of x-rays and other particles such as electrons, protons, photons, neutrons, etc., where such particle emissions can be utilized in applications such as radiography, airport security, crystallography, astronomy, spectroscopy, etc. While x-rays can identify high atomic number (high Z) materials such as stainless steel, neutrons can be utilized to identify low Z material such as polystyrene foams, wood, water. It can be beneficial to have a mixed source of x-rays and other particles which, when irradiated by a laser beam, can facilitate identification of both high Z and low Z materials.

While neutrons can be produced by a laser-target approach, neutrons can also be produced by Dense Plasma Focus machine (DPF). DPF typically produce neutrons of 2.45 MeV (when using deuterium-deuterium) or 14.1 MeV (when using deuterium-tritium). The maximum neutron energy is thus limited to 14 MeV. The neutron emission is typically isotropic, and requires use of tritium which is radioactive, and difficult to obtain and store. A conventional laser-target approach can generate neutrons having energies>15 MeV, can be energy tunable in a more continuous way. It can also allow for a broader energy spectrum of the neutrons produced and thus allows for applications such as resonance radiography. However the laser can be costly owing to the requirement to operate with a beam intensity exceeding $1 \times 10^{18}$ W/cm².

SUMMARY

The following is a brief summary of subject matter that is described in greater detail herein. This summary is not intended to be limiting as to the scope of the claims.

Various exemplary embodiments presented herein relate to forming x-rays and other particles such as protons, electrons, neutrons, photons, etc. In an exemplary embodiment a system is presented, wherein the system comprises a first target, whereby the first target comprises a first tip material which forms a conical solid comprising an apex, a circular base, and a lateral surface joining the apex to a perimeter of the base. In a further embodiment, at least one photon in a laser beam can impinge upon the base and enter the first tip material to facilitate formation of at least one of a first x-ray photon or a first particle, wherein the first x-ray photon can be emitted from the apex in a direction on-axis to an axis which passes through the apex and about which the base has rotational symmetry.

Another exemplary embodiment is presented comprising a method for generating x-rays and other particles, wherein the method comprises directing a first photon onto a first target, the first target comprising a first tip material forming a conical solid comprising: an apex, a circular base, and a lateral surface joining the apex to a perimeter of the base, wherein the first photon can impinge upon the base and enter the first tip material to facilitate forming a first x-ray photon. In a further embodiment, the first x-ray photon can be emitted from the apex in a direction on-axis to an axis which passes through the apex and about which the base has rotational symmetry.

A further exemplary embodiment for generating x-rays and other particles can utilize an array comprising: a first target, the first target comprising a first tip material, where the first tip material forms a conical solid having an apex, a circular base, and a lateral surface joining the apex to a perimeter of the base. A first photon in a laser beam can impinge upon the base and enter the first tip material to facilitate formation of a first x-ray photon, the first x-ray photon can be emitted from the apex in a direction on-axis to an axis which passes through the apex and about which the base has rotational symmetry. In a further embodiment, the array can also include a second target, whereby the second target can comprise a second tip material, the second tip material forms a conical solid having an apex, a circular base, and a lateral surface joining the apex to a perimeter of the base. A second photon in the laser beam can impinge upon the base and enter the second tip material to facilitate formation of a second x-ray photon. In an embodiment, the second x-ray photon can be emitted from the apex in a direction on-axis to an axis which passes through the apex and about which the base has rotational symmetry. In another embodiment, the first x-ray photon can have a wavelength different to a wavelength of the second x-ray photon and, further, the emission direction of the first x-ray photon can be about parallel to the emission direction of the second x-ray photon The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 5 is a block diagram of an apparatus to form neutrons, according to an embodiment.

FIG. 6 is a block diagram of circular target array, according to an embodiment.

FIG. 7 is a block diagram of linear target array, according to an embodiment.

FIG. 8 is a block diagram of rectangular target array, according to an embodiment.

DETAILED DESCRIPTION

Figure 1:
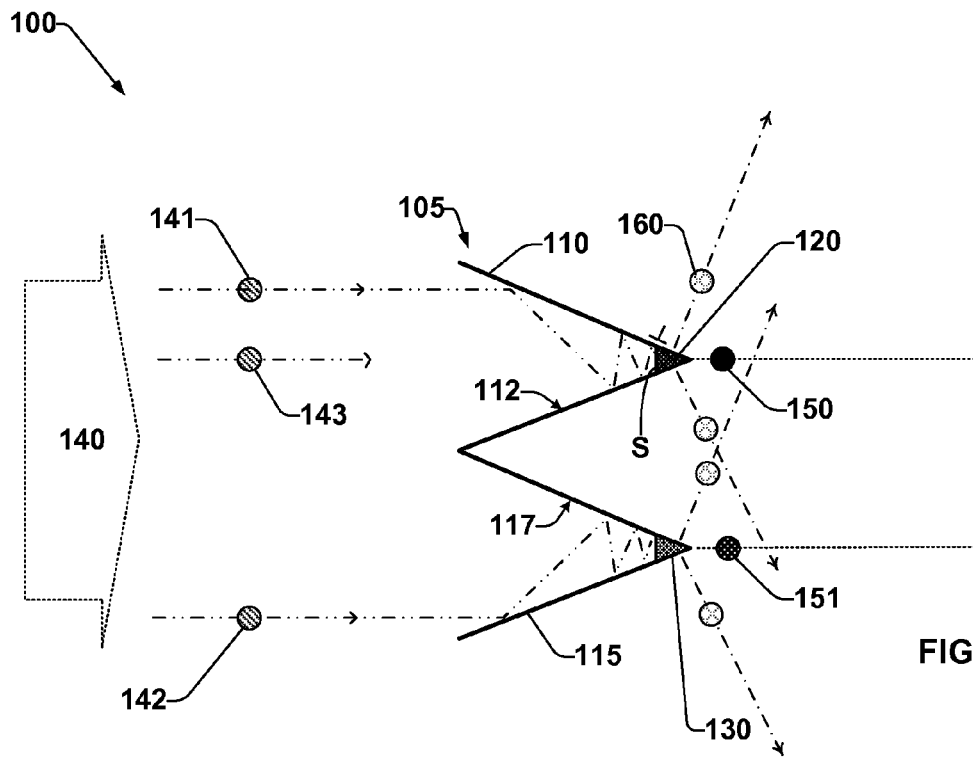
FIG. 1 is a block diagram of a system to facilitate generation of x-rays and other charged particles, according to an embodiment.

Various technologies relating to generation of x-rays and other particles are presented, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments presented herein relate to the generation of x-rays and other charged particles such as protons, photons, electrons, neutrons, etc. In an embodiment, a point-like polychromatic x-ray source(s) is presented, whereby the x-rays can be separated from other emitted particles. A plurality of disparate source materials (e.g., x-ray source materials) can be combined on the same array (or patch) to facilitate fabrication of co-located mixed point-like sources (e.g., tips) which can be utilized to form a polychromatic particle cloud, e.g., a plurality of x-rays having a range of energies and or wavelengths, etc. Another embodiment relates to a source for the generation of particles such as protons, which can be directional and further utilized to facilitate generation of neutrons at a secondary target. The various sources (e.g., x-ray, photon, proton, neutron, etc.) can be generated by interaction of a laser beam (or other driver device) with an array comprising a plurality of three-dimensional (3D) conical targets and tips, whereby the conical target sidewall can be utilized to microfocus a portion of a laser beam onto the tip material. As described herein, 'conical' relates to a cone having a sidewall (e.g., straight, parabolic, etc.) which can converge at a tip, where, in an embodiment, an array can be formed comprising of a several adjacent conical shapes that can be irradiated (e.g., simultaneously, consecutively, etc.) by a laser beam, or a portion of the laser beam.

Figure 2:
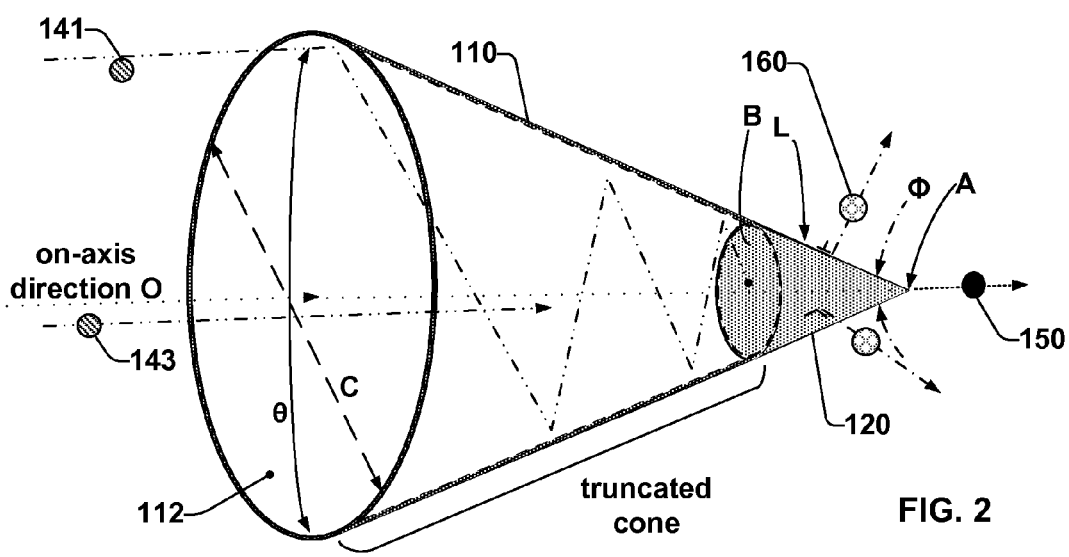
FIG. 2 is a block diagram of a conical target to facilitate generation of x-rays and other charged particles, according to an embodiment.

FIGS. 1 and 2 illustrate system 100 which can be utilized to facilitate generation of x-rays and other charged particles, in accordance with an embodiment. As depicted in FIG. 1, a laser beam 140 is irradiating an array 105, where the array 105 can be formed with a plurality of conical structures, also referred to herein as targets. For example, as shown, a first conical structure comprises a sidewall 110 and a tip 120, where as shown in the three dimensional depiction of FIG. 2, sidewall 110 can be considered a truncated cone and/or a hollow frustrum having a base C bound by a lateral surface, and tip 120 can be considered a solid conical structure having a circular base B, an apex A, and a lateral surface L connecting apex A with the base B, where base B forms the upper boundary of the truncated cone. An axis O is indicated and passes through the apex A and a midpoint on base B about which base B has rotational symmetry. Axis O can intercept base B perpendicularly, and any direction parallel to axis O can be considered to be an 'on-axis direction'. As shown in FIG. 1, a second conical structure can be incorporated into array 105, where the second conical structure comprises a sidewall 115 and tip 130. A plurality of conical structures can be incorporated into an array 105, as further illustrated in FIGS. 6, 7, and 8. It is to be appreciated that while sidewall 110 is depicted as a frustrum, where the angle θ of sidewalls 110 are aligned with, i.e., equal to, the angle Φ of surface L of tip 120 (per FIG. 2), other conical structures can be formed whereby the angle θ of sidewalls 110 can be less than or greater than an angle Φ of surface L. Further, while FIGS. 1 and 2 depict a conical structure comprising a tip 120 having a circular base B and further, a circular aperture C forming the base of the truncated cone 110, the various embodiments presented herein are not so limited whereby sidewall 110 and tip 120 can be formed about an aperture C and/or base B having a polygonal form (e.g., the conical target structure forms a pyramid), an elliptical form, etc.

As shown in FIG. 1, respective photons 141 and 142 in laser beam 140 are incident upon the surface of respective conical structures, e.g., inner surface 112 of sidewall 110 and inner surface 117 of wall 115, whereby in the example presented, photon 141 is directed towards tip 120 and photon 142 is directed towards tip 130. Effectively, photon 141 is microfocused on to the tip 120 by the first truncated cone structure formed by sidewall 110, and similarly, photon 142 is microfocused on to the tip 130 by the second truncated cone structure formed by sidewall 115. As also shown in FIGS. 1 and 2, photon 143 in laser beam 140 is directed along an on-axis direction, or near on-axis direction, and hence will impinge directly upon the basal surface B of the tip 120 without having to be directed to the tip by inner surface 112 of sidewall 110.

Microfocusing is a technique which can be utilized to increase the volume of energy incident upon a given area, e.g., the basal surface B of tip 120, based upon directing energy (e.g., photons) captured over a larger area, aperture area C, of the base of the truncated cone comprised of the sidewall 110 and inner surface or wall 112 (per FIG. 2). It is to be appreciated that while only photons 141 and 142 are shown as being microfocused onto respective tips 120 and 130, a plurality of photons can be focused onto the respective tips as part of the microfocusing operation. In an embodiment, microfocusing can concentrate energy in laser beam 140 onto tip 120, where the energy concentration, in an embodiment, can be at least $1 \times 10^{-19}$ watts/square centimeter (W/cm$^2$) which can be a concentration of energy required to facilitate generation of any of x-rays 150, and/or other particles 160 (e.g., electrons, protons, photons, etc.), at a target material, tip 120, when impinged by energy (e.g., photonic energy) in a laser beam, e.g., in a laser beam 140.

In an embodiment, the conical structures comprising array 105 can be of any suitable dimension, for example, aperture C can be of any value, such as from about 100 μm to about 1 mm diameter, while the exposed region of a tip (e.g., tip 120, basal surface B) can be in the range of about 5 μm to about 20 μm in diameter. To facilitate microfocusing of a laser beam 140, the angle θ (also known as a cone angle) between opposite surfaces of a conical structure formed with a sidewall 110 can be about 10° to about 40°. Further, while the various embodiments presented herein relate to microfocusing of a laser beam 140 based in part on reflection of photons in the laser beam on an inner surface 112 of a sidewall 110, the thickness of the sidewall material 110 may not be of critical importance to the various embodiments presented herein. However, to facilitate fabrication of at least one conical structure in an array, the sidewall 110 can have a thickness of about 10 μm to about 50 μm. Furthermore, surface 112 can have a surface finish that does not interfere with propagation of photons (e.g., photon 141) towards the tip 120. Thus, in an embodiment, sidewall 112 can have a polished surface or of a roughness less than a roughness that would cause interruption of the conveyance (e.g., a backward reflection) of the photons. Any suitable material can be utilized to form sidewall 112, where such materials include, in a non-exhaustive list, aluminum (Al), copper (Cu), gold (Au), titanium (Ti), tantalum (Ta), tungsten (W), etc., where such materials can be in the form of a single layer or a sidewall material can be formed from a plurality of layers comprised of two or more exemplary materials.

In an embodiment, photons in the laser beam 140 can have a trajectory that is parallel (e.g., to the on-axis direction) or slightly converging in nature as required to facilitate microfocusing of the photons (e.g., photons 141, 142, and/or 143) in the laser beam 140 on the respective tips 120 and 130 based upon direct incidence of a photon (e.g., 143) or guiding a photon (e.g., photon 141 or 142) to a tip based on reflection of the photon(s) on an inner surface of a sidewall (e.g., surfaces 112 and 117 of respective sidewalls 110 and 115). Hence, rather than focusing a laser beam on the target material (e.g., tip 120 and/or 130), utilizing a collimated laser beam in conjunction with the conical targets enables the microfocusing operation to be achieved. In an embodiment, photons in a collimated laser beam can facilitate a symmetrical irradiation of the sidewall surface(s) and accordingly a symmetrical microfocused irradiation of the tip(s).

To facilitate a high rate of photon irradiation on the tips 120 and 130, the source of laser beam 140 can have a high repetition rate, e.g., a minimum of 10 Hz, where in a further embodiment, laser beam 140 can be an ultrashort laser pulse (e.g., as available with chirped pulse amplification). The high repetition rate can also enable an array with a large number (e.g., about 100) of conical target structures comprising respective sidewalls and tips to be irradiated by the laser beam or a series of arrays such as described herein with reference to FIG. 6, 7 or 8 combined on a larger structure. Owing to an expectation that each array can be vaporized when irradiated with the laser 140 for an extended duration, the next array is positioned on the axis of laser 140 to facilitate a high repetition rate. Further, the various embodiments presented herein can be conducted under vacuum to negate interaction of air molecules with any of the laser beam 140, any emitted x-rays (e.g., x-rays 150 and 151), any emitted particles (e.g., particles 160, particles $E_1$, $E_2$ and $E_3$ as presented in FIGS. 4 and 5 herein), and/or any emitted neutrons (e.g., neutrons 580 as presented in FIG. 5 herein), which could cause a reduction in the efficiency of the various systems presented herein.

In an embodiment, to facilitate the formation of a plurality of sources which can be utilized to generate a range of x-rays having a range of energies (e.g., in the range of 100 eV to 100 keV), wavelengths (e.g., in a range of 0.01 to 10 nm), frequencies (30 PHz to 30 EHz, ($3 \times 10^{16}$ Hz to $3 \times 10^{19}$ Hz)), etc., to form a polychromatic x-ray cloud, disparate materials can be utilized to form the respective tips in an array 105. It is to be appreciated that while the foregoing relates to formation of x-rays, the embodiments can be equally applied to any other charged particle(s), e.g., protons, photons, electrons, neutrons, etc. Any material that facilitates the formation of x-rays or other particles (e.g., electrons, protons, photons, etc.) can be utilized as a material for tips 120 or 130, where such materials can include, in a non-exhaustive list, Al, Au, Cu, Ti, W, silver (Ag), molybdenum (Mo), rhodium (Rh), argon (Ar), krypton (Kr), or an alloy comprising any of the previous listing, etc. By utilizing a plurality of tip materials incorporated into an array of targets a plurality of x-rays (e.g., a polychromatic x-ray cloud) can be generated having a plurality of energies and wavelengths associated with any of the respective $K_\alpha$, $K_\beta$, $K_\gamma$, $K_\delta$, $L_\alpha$, $L_\beta$, $M_\alpha$ and/or $M_\beta$ emission spectra for each tip material. As illustrated in FIG. 1 (and in FIGS. 6, 7, and 8), tip 120 can be formed with a material different to a material utilized to form tip 130. For example, a first tip, tip 120, can be formed from a first material (e.g., Cu) generating first x-rays with an energy of about x KeV, while a second tip, tip 130, can be formed from a different material (e.g., Ag) generating second x-rays with an energy of about y KeV.

The technology pertaining to generation of x-rays and other particles based upon a laser beam impinging upon a target material is known to those skilled in the art and is not expanded upon here. However, in summary, as photons (e.g., photons 141, 142 and 143) in laser beam 140 impinge upon a target (e.g., tips 120 and 130) electrons in the target material are driven towards the tip apex A (per FIG. 2). Motion of the electrons to the tip point A causes the material in respective tips 120 and 130 to become ionized owing to molecular bonding dissociation, whereby a plasma can be formed at the tip point(s) A. As an electron is re-absorbed into an ionized atom in respective tip materials 120 and 130, the energy imparted on the electron by the photon (e.g., either of photons 120 or 130) as a function of the ionization operation can be released in the form of x-ray radiation (e.g., x-ray photons 150 and/or 151) or formation of other particles 160. Hence, in an embodiment, the different energy gaps for respective materials (e.g., Al vs. Cu vs. Au, etc.) engenders formation of x-rays having according energies to facilitate formation of a polychromatic x-ray cloud. As indicated in FIG. 1, x-ray photon 150 is shaded with a color different to that of x-ray photon 151 to indicate that the x-ray photons 150 and 151 are of different wavelengths and/or energies.

In another embodiment, the shape of the tip can be a factor in the facilitation of a clean x-ray source. Based upon at least one emission characteristic between x-rays (e.g., x-rays 150 and 151) and other particles (e.g., particles 160) formed at a tip, tips 120 and 130 can be formed to facilitate separation of the x-ray spectra 150 and 151 from a cloud of other particles 160 formed at the tip(s). As shown in FIGS. 1 and 2, where a tip is formed with an acute angle Φ (per FIG. 2), e.g., up to about 40°, advantage can be taken of a phenomenon whereby particles 160 (e.g., electrons, protons, photons, etc.), formed at the tip(s) 120 and/or 130, are ejected from the tip at a direction perpendicular to the surface L of the tip. Such an operation results in the on-axis emission, relative to the cone structure, of the x-ray photons 150 and 151 being effectively free of other particles, e.g., non-x-ray particles. The difference in directionality between the emission of particles 160 perpendicular to surface L and the emission of x-rays 150 and 151 in an 'on-axis' direction enables the separation of the x-rays 150 and 151 in the 'on-axis' direction with respect to the particles 160, thereby enabling operation of an array 105 to provide a clean x-ray source. As shown in FIG. 1, the emission direction of x-ray 150 can be parallel to the emission direction of x-ray 151.

Figure 3:
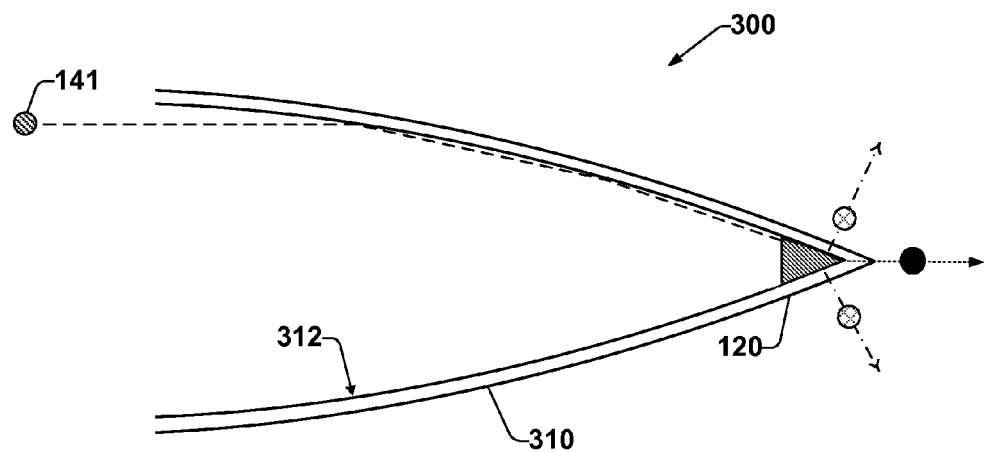
FIG. 3 is a block diagram of a conical target with a curved profile, according to an embodiment.

Turning to FIG. 3, while FIGS. 1 and 2 illustrate embodiments having straight sidewalls 110 and 115, the various embodiments presented herein can also be utilized with a conical structure having a curved sectional profile. As shown in FIG. 3, a conical target 300 can have a sidewall 310 forming a truncated cone which is parabolic, in accordance with an embodiment. Conical target 300 can include a tip 120 in the prolongation of the conical shape or one that has the same form as that presented in FIGS. 1 and 2 to facilitate generation of x-rays 150 and other particles 160 as previously described, as a result of a photon 141 (e.g., in laser beam 140) being directed (e.g., by impinging on the sidewall inner surface 312) towards tip 120 as microfocusing occurs.

Figure 4:
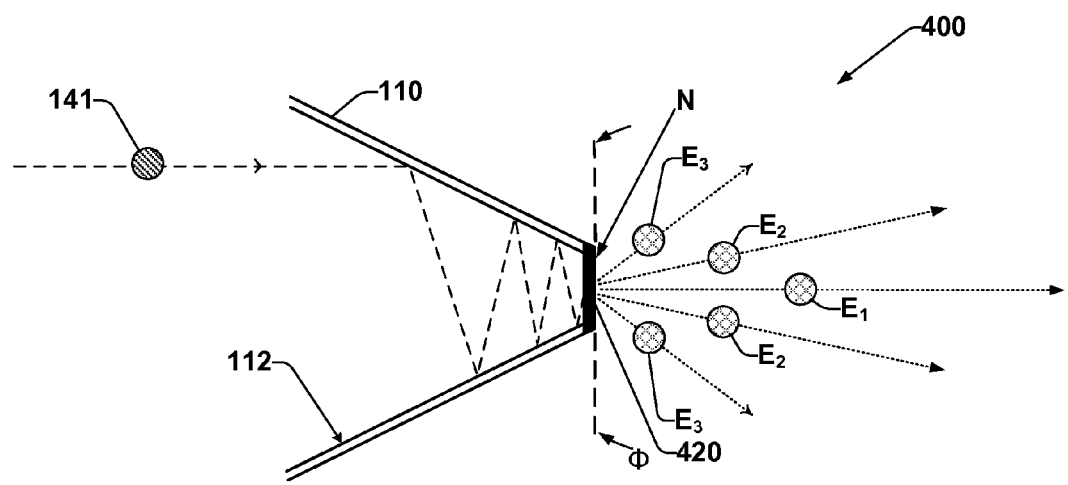
FIG. 4 is a block diagram of a blunt target tip, according to an embodiment.

FIG. 4 illustrates a system 400 which includes a 'blunt' tip, according to an embodiment. As previously described, a tip (e.g., tips 120 and 130) can be formed with an acute profile (e.g., Φ<about 40°), for example, to facilitate a clean x-ray source. However, as shown in FIG. 4, a tip 420 can be formed having a blunt profile (e.g., angle Φ>about 40°). A blunt profile can result in the formation of a plurality of particles $E_1$-$E_3$ (e.g., electrons, protons, photons, etc., such as particles 160) which are emitted perpendicularly, or nearly perpendicularly, from respective points on surface N of the tip 420 such that the plurality of particles $E_1$-$E_3$ can form a beam having a narrow divergence about the on-axis direction. In an embodiment, a tip 420 having a blunt profile can lead to generation of particles 160 being emitted 'on-axis' or close thereto. Those particles (e.g., $E_1$) which are emitted on-axis can have a higher energy than particles (e.g., $E_2$ and/or $E_3$) which are emitted at an angle not on-axis, whereby the further a particle is emitted at an angle directed away from the on-axis direction, the less the energy of the particle. Accordingly, the particles produced at a blunt tip 420 can have a range of particle energies where the energy of $E_1 > E_2 > E_3$.

FIG. 5 illustrates system 500 which can be utilized in the generation of neutron particles, according to an embodiment. As shown in FIG. 5, a primary target, tip 420, is being utilized in conjunction with a secondary target, target 590, to facilitate formation of neutron particles 580. A photon 141, in laser beam 140, as part of a microfocusing operation, is directed towards tip 420, e.g., either impinges upon the tip 420 (per photon 143 in FIG. 1) or is directed onto the tip 420 by reflecting on an inner surface(s) of sidewall 110. As previously described, particles $E_1$, $E_2$, and $E_3$ can be formed and emitted from tip 420, where, in an embodiment, particles $E_1$, $E_2$, and $E_3$ can be protons. As presented with reference to FIG. 4, the energy of protons can correlate to $E_1 > E_2 > E_3$, and accordingly, the protons E1 and E2 can each have a magnitude of energy required to facilitate the generation of at least one neutron 580 as a result of protons E1 and E2 irradiating target 590, wherein the at least one neutron 580 can form a neutron beam.

Relative to tip 420, target 590 can be of any required size, and further, positioned at any distance D from the tip 420 to facilitate interception of the protons being emitted from tip 420. In an embodiment, target 590 can be a disc located on a support structure (e.g., a wireframe) which can be positionally adjusted along D. In another embodiment, target 590 can be a dot target supported by and/or embedded in a surrounding material of a different composition, where the surrounding material structure can be positionally adjusted along D. Any suitable material can be utilized to form the secondary target(s), where, in a non-exhaustive list, such materials include lithium (Li), beryllium (Be), deuterium (D), deuterated plastic ($C_xD_y$, with x and y between 1 and 8)) etc.

FIG. 5 depicts target 590 being positioned such that protons E1 and E2 are incident upon target 590 while protons E3 are not being captured at target 590. Accordingly, only the protons with an energy suitable for production of neutrons 580 at target 590 are bombarding the target 590. By capturing protons of a specific energy, the kinetic aspect of the interaction between proton capture and neutron formation can be enhanced to facilitate control of the directionality of a neutron beam produced with neutrons 580.

It is to be appreciated that any protons of any energy can be captured by target 590 based upon the size and position of the target 590 relative to the tip 420. Hence, based upon the combination of photon(s) 141 impinging upon tip 420, the emission of protons $E_1$, $E_2$, and $E_3$, and the interaction of the protons $E_1$, $E_2$, and $E_3$ with material forming target 590, system 500 can be utilized as a source for neutrons 580. In comparison with a dense plasma focus source operating with deuterium fusion (D-D) having a neutron yield of about $6 \times 10^9$ neutrons/steradian (sr) in the forward direction of a 40 nanosecond pulse, a system based on laser-produced neutrons, as shown in FIG. 5, can obtain a yield of about $8 \times 10^8$ neutrons/sr for a 10 picosecond pulse in the forward direction with a repetition rate of about 10 Hz or more.

Any suitable material can be utilized to form the secondary target(s), where, in a non-exhaustive list, such materials include lithium (Li), beryllium (Be), deuterium (D), deuterated plastic ($C_xD_y$, with x and y between 1 and 8)) etc.

As shown in FIGS. 6, 7 and 8, a number of arrangements of the conical target structures can be configured, according to an embodiment. As previously mentioned, an array can comprise of several adjacently placed conical targets which can be irradiated simultaneously, or in a consecutive manner, where each target can be irradiated by a portion of the laser beam and each target can microfocus the portion of the beam captured by the target aperture. For example, a circular arrangement 600 can be produced as shown in FIG. 6, where a plurality of conical structures having sidewalls 110 and tips 120, 130, and 620 of differing materials to facilitate formation of a cloud of polychromatic x-rays and other particles can be located on a common support 610. Another arrangement is a linear arrangement 700 as shown in FIG. 7, where a plurality of conical structures having sidewalls 110 and tips 120, 130, and 620 of differing materials to facilitate formation of a cloud of polychromatic x-rays and other particles can be located on a support 710, e.g., for utilization in a line focus application. A further arrangement is a rectangular arrangement 800 as shown in FIG. 8, where a plurality of conical structures having sidewalls 110 and tips 120, 130, and 620 of differing materials to facilitate formation of a cloud of polychromatic x-rays and other particles can be located on a support 810. It is to be appreciated that the structures presented in FIGS. 6, 7, and 8 are examples of possible array formations, and any arrangement can be constructed to include any number of conical structures and/or any distribution of materials to be utilized as tips for the conical structures, where the conical structures can be of any arrangement and not limited to the examples of circular, linear, or rectangular. It is to be appreciated that while FIG. 6 illustrates an array of conical structures comprising a plurality of tip materials 120, 130, and 620, the various embodiments are not so limited and a common material can be utilized for all of the respective conical structures in an array. Further, any suitable fabrication technique can be utilized in the formation of any of the tip(s), the conical target structure(s), the support(s), the secondary neutron-forming target(s), etc., where such fabrication techniques can include and/or directed at a microfabrication, a microelectromechanical system, and the like, as known to a person having skill in the art.

The number of targets (e.g., each conical structure formed with a sidewall 110 and a tip 120) which can be irradiated to form the desired x-rays and/or particles can be a function of the available energy in a source laser beam. For example, if a source laser (e.g., laser beam 140) has an available energy of about 1 joule (1 J) then the target array may be formed with a couple of conical structures. Whereas, if the source laser has an available energy of 100 J then the target may be formed, for example, with more than twenty conical structures. In an embodiment, the number of targets can be a function of the energy available in a laser beam (or portion thereof) and/or the diameter of the laser beam, and the ability to achieve the minimum energy of about $1\times10^{19}$ W/cm² at each respective tip in the number of targets, where the energy at the tip can be maximized as a function of a microfocusing operation, as previously described.

Figure 9:
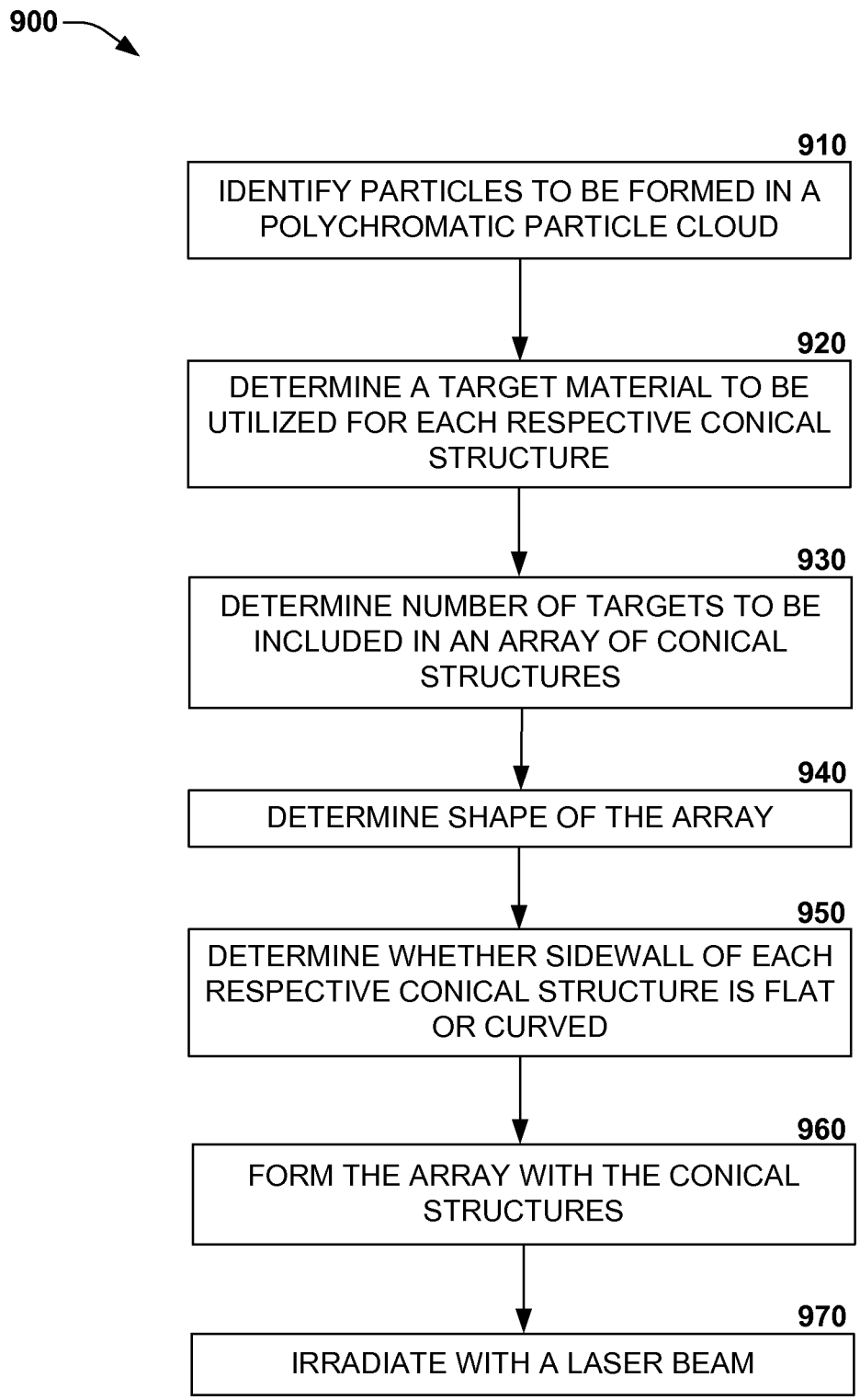
FIG. 9 is a flow diagram illustrating an exemplary methodology for generating x-rays and other charged particles, according to an embodiment.
Figure 10:
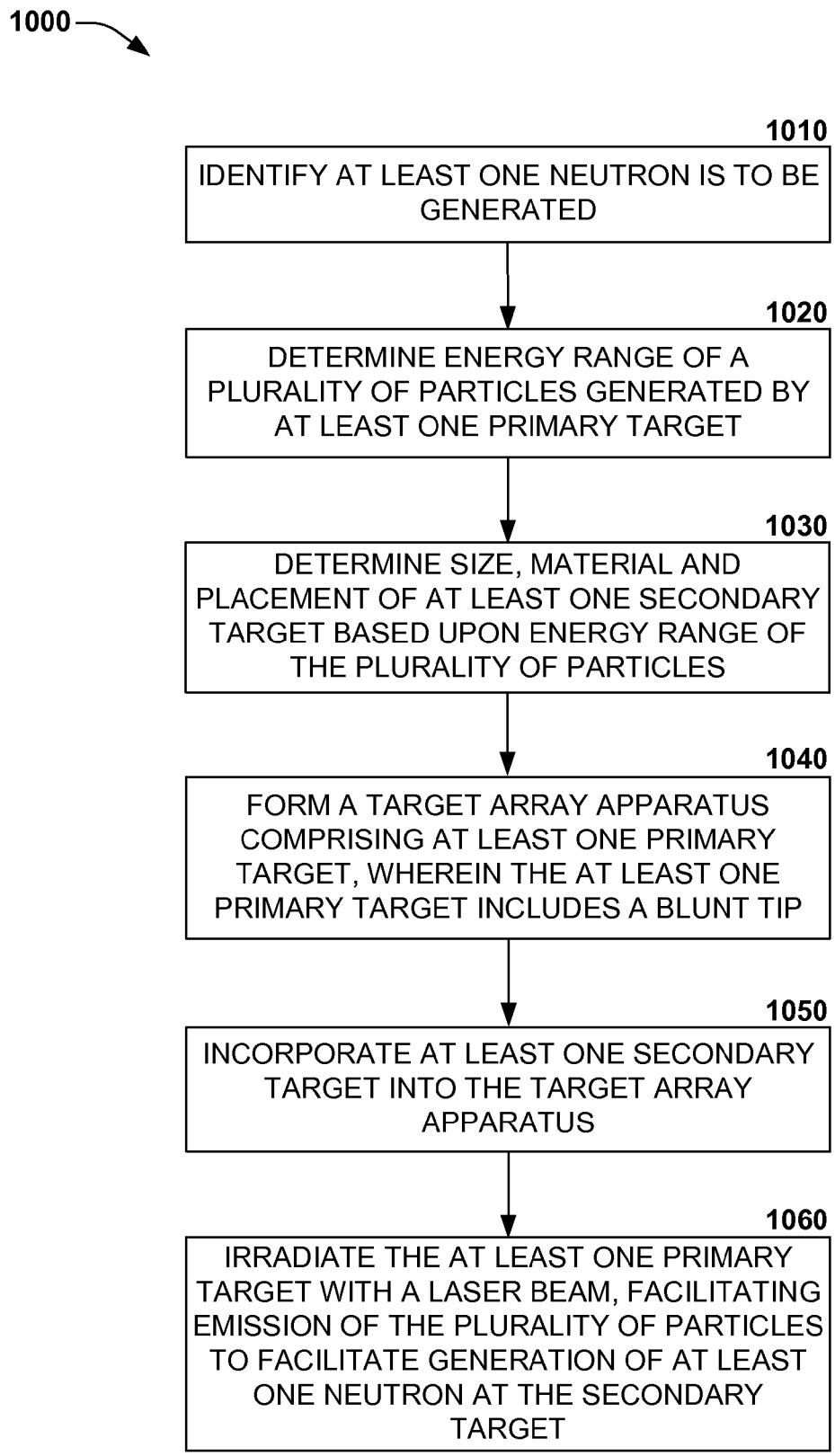
FIG. 10 is a flow diagram illustrating an exemplary methodology for generating neutrons, according to an embodiment.

FIGS. 9 and 10 are methodologies relating to generation of x-rays and other particles. While methodologies 900 and 1000 are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the particular methodology described herein.

FIG. 9 illustrates an exemplary methodology 900 for generating one or more types of high energy, charged particles (e.g., x-rays, protons, photons, neutrons, electrons, etc.). As previously mentioned, by forming an array comprising a plurality of different tip materials, different charged particles can be formed and further, based in part on the tip profile, different beam profiles can be formed, e.g., a proton beam, an x-ray beam, etc. The tips can be irradiated by a laser beam, with the laser beam being microfocused onto the tip to facilitate an increase in the energy at the tip compared with an energy at the base of a conical structure which includes the tip. At 910, a determination can be made regarding which particles are to be formed. For example, are x-rays of interest? And, if so, what is the energy range of the x-rays to form a polychromatic x-ray cloud? Alternatively, the requirement may be to produce a proton beam to facilitate subsequent formation of neutrons at a secondary target.

At 920, based upon the particles of interest, a determination can be made regarding which materials are to be utilized as target materials. For example, if a polychromatic x-ray cloud is to be formed, which materials, when impinged by a laser beam, will produce x-rays having the required energies, where such a selection can be made from materials including Al, Au, Cu, Ti, W, Ag, Mo, Rh, Ar, Kr, etc.

At 930, a determination can be made regarding the number of targets to be combined to form an array, for example, based upon such factors as the energy, frequency, beam diameter, etc., of a laser source and the requirement to achieve the minimum energy of about $1\times10^{19}$ W/cm² at each respective tip. Accordingly, the number of targets to be utilized can be determined, where each target can be irradiated by the laser beam, or a portion thereof.

At 940, the shape of the array can be determined. For example, as previously mentioned, an array can comprise of several adjacently placed conical targets which can be irradiated simultaneously, or in a consecutive manner, where each target can be irradiated by a portion of the laser beam and each target can microfocus the portion of the beam captured by the target aperture. Different arrangements are available, such as a circular arrangement, a linear arrangement, a rectangular (or square) arrangement, etc. (as illustrated in FIGS. 6, 7 and 8).

At 950, the shape of each conical structure can be determined. For example, the profile of the sidewall of the conical structure(s) can be identified, such as flat or curved (e.g., parabolic), to facilitate microfocusing of the laser beam, or portion thereof. Also, based upon whether a particular particle(s) type is to be separated from another particle(s) type, the angle (e.g., angle $\Phi$) of each tip can be identified. For example, if a clean source of x-rays is to be provided, then a tip(s) can be formed with a narrow angle (e.g., $\Phi<40°$) such that x-rays can be generated on-axis while other particles are formed perpendicular to the lateral surface of the tip(s), as previously described. Alternatively, if a proton beam is to be generated, then the tip angle can be formed with a 'blunt' profile (e.g., $\Phi>40°$) such that when the protons are emitted perpendicularly to the lateral surface of the tip, angle $\Phi$ is such that the protons are emitted in a beam of low divergence from the on-axis direction.

At 960, an array comprising a plurality of conical structures can be formed, where each conical structure can include a sidewall forming a truncated cone and a tip material.

At 970, the array can be irradiated by the laser beam. As previously described, photons in the laser beam can facilitate formation of any of x-rays, electrons, photons, protons, etc. In an embodiment, for the production of x-rays, microfocusing of the laser beam, or portion thereof, can facilitate a minimum energy intensity of about $1\times10^{19}$ W/cm² at each respective tip, with generation of x-rays in the on-axis direction. Alternatively, other charged particles can be formed and emitted in a direction perpendicular to the tip(s) lateral surface. Based upon a number of conical structures being combined into an array, respective x-rays and charged particles emitted at each tip can combine to form beams, e.g., an x-ray beam, a proton beam, an electron beam, etc. The particular beam can be subsequently utilized based upon a particular application, e.g., radiology, material security, etc.

FIG. 10 illustrates an exemplary methodology 1000 for forming neutrons at a secondary target based upon the generation and emission of protons at a primary target. As previously mentioned, an array of targets can be irradiated by a laser beam to facilitate emission of protons at the targets. Based at least in part upon the target profile, the protons can be directed to form a beam having low convergence which can bombard a secondary target. Interaction of the proton beam with the material comprising the secondary target, a neutron stream can be formed. Based upon the size and position of the secondary target, only those protons having a certain energy can be incident upon the secondary target. At 1010, a determination can be made that at least one neutron is to be formed, e.g., at a secondary target. Accordingly, while a plurality of charged particle types can be formed at a target (e.g., a tip) that is irradiated by a laser beam, where such particles can include x-rays, photons, protons, electrons, neutrons, etc., the target profile can be configured such that the conditions at the tip during laser beam irradiation favor proton formation.

At 1020, a determination can be made regarding the energy required for the protons. As previously mentioned, protons which are emitted on-axis, or near on-axis, have a higher energy than those protons emitted off axis (e.g., $E_1>E_2>E_3$, per FIGS. 4 and 5). Hence, based on the range of possible energies, a determination can be made regarding the beam spread that includes the protons of the required energies.

At 1030, based upon the required proton energies and the beam spread relative to the on-axis direction, the size, material and position of the secondary target relative to the size and position of the primary target (i.e., the target array at which the protons are formed) can be determined, whereby the size and position of the secondary target can be such that only those protons having a required energy are incident upon the secondary target and any protons having an undesired energy miss the secondary target. As previously mentioned, different target materials can produce protons having respectively different energies, e.g., material 1 produces protons with energy a, while material 2 produces protons with energy b. Hence, a material can be selected to form the primary target based upon a desired proton energy. Accordingly, by selecting a material to produce protons and an appropriate angle $\Phi$, a clean source of protons can be facilitated.

At 1040, an array can be formed, where the array can include a plurality of conical target structures, where each conical target can be formed from a solid tip and a hollow truncated cone. As previously described, by utilizing a blunt tip (e.g., Φ>40°) advantage can be taken of the phenomenon of protons being emitted in a direction perpendicular to a point on the lateral surface of the tip, and further, angle Φ can be such that the protons are emitted in a beam of low divergence from the on-axis direction of the tip and/or conical target.

At 1050, the secondary target can be incorporated into an apparatus comprising a laser beam source and also the primary target array.

At 1060, the laser beam can irradiate the primary target array whereby protons having a range of energies $E_1$, $E_2$, and $E_3$ can be formed and emitted from the various conical targets and tips forming the primary target array. The proton cloud can be directed towards the secondary target such that only those protons having a required energy are captured at the secondary target. The captured protons can interact with the material forming the secondary target, whereby neutrons can be formed and emitted at the secondary target.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
   a first target, the first target comprising a first tip material, wherein the first tip material forms a conical solid comprising:
   an apex;
   a circular base; and
   a lateral surface joining the apex to a perimeter of the base, wherein at least one photon in a laser beam impinges upon the base and enters the first tip material to facilitate formation of at least one of a first x-ray photon or a first particle, wherein the first x-ray photon is emitted from the apex in a direction on-axis to an axis which passes through the apex and about which the base has rotational symmetry.

2. The system of claim 1, wherein the first particle is an electron, a photon, a proton, or a neutron.

3. The system of claim 1, wherein the first particle is emitted from the first tip material in a direction perpendicular to a point on the lateral surface of the conical solid.

4. The system of claim 1, further comprising a second target, wherein the second target comprising a second tip material, the second tip material is different from the first tip material.

5. The system of claim 4, wherein the second tip material emits a second x-ray photon when the second tip material is impinged upon by at least one other photon in the laser beam.

6. The system of claim 5, wherein the first x-ray photon has a first wavelength and the second x-ray photon has a second wavelength, the first wavelength and the second wavelength are different.

7. The system of claim 4, wherein the first tip material and the second tip material are formed from aluminum, gold, copper, titanium, tungsten, silver, molybdenum, rhodium, argon, or krypton.

8. The system of claim 1, wherein the first tip material is located on a hollow truncated cone with a sidewall forming a lateral surface of the hollow truncated cone, the sidewall directs the at least one photon in the laser beam on to the base of the first tip material.

9. The system of claim 1, wherein an angle between the axis and the lateral surface is between about 5° and 20°.

10. The system of claim 1, further comprising a second target, wherein the first particle is a proton and subsequent to emission from the first target, the first particle impinges upon the second target to facilitate formation and emission of a neutron from the second target.

11. A method comprising:
    directing a first photon onto a first target, the first target comprising a first tip material forming a conical solid comprising:
    an apex;
    a circular base; and
    a lateral surface joining the apex to a perimeter of the base, wherein the first photon impinging upon the base and entering the first tip material to facilitate forming a first x-ray photon wherein the first x-ray photon being emitted from the apex in a direction on-axis to an axis which passes through the apex and about which the base has rotational symmetry.

12. The method of claim 11, further comprising:
    directing a second photon onto a second target, the second target comprising a second tip material forming a conical solid comprising:
    an apex;
    a circular base; and
    a lateral surface joining the apex to a perimeter of the base, wherein the second photon impinging upon the base and entering the second tip material to facilitate forming a second x-ray photon wherein the second x-ray photon being emitted from the apex in a direction on-axis to an axis which passes through the apex and about which the base has rotational symmetry, and the axis of the first target is parallel to the axis of the second target.

13. The method of claim 12, wherein the first tip material and the second tip material are formed from different materials.

14. The method of claim 13, wherein the first x-ray photon having a different wavelength to a wavelength of the second x-ray photon.

15. The method of claim 12, wherein the first tip material and the second tip material are formed from a common material.

16. The method of claim 11, further comprising:
    directing a second photon onto the first target, wherein the second photon impinging upon the base and entering the first tip material to facilitate forming a first particle wherein the first particle being emitted from the first tip material in a direction perpendicular to a point on the lateral surface of the conical solid of the first target.

17. The method of claim 16, wherein the first particle is a proton and the direction of emission facilitating the first particle to be incidental upon a second target facilitating emission of a neutron from the second target based in part on interaction between the first particle and material comprising the second target.

18. An array comprising:

a first target, the first target comprising a first tip material, the first tip material forms a conical solid having an apex, a circular base, and a lateral surface joining the apex to a perimeter of the base, wherein a first photon in a laser beam impinges upon the base and enters the first tip material to facilitate formation of a first x-ray photon, the first x-ray photon is emitted from the apex in a direction on-axis to an axis which passes through the apex and about which the base has rotational symmetry; and a second target, the second target comprising a second tip material, the second tip material forms a conical solid having an apex, a circular base, and a lateral surface joining the apex to a perimeter of the base, wherein a second photon in the laser beam impinges upon the base and enters the second tip material to facilitate formation of a second x-ray photon, the second x-ray photon is emitted from the apex in a direction on-axis to an axis which passes through the apex and about which the base has rotational symmetry, the first x-ray photon has a wavelength different to a wavelength of the second x-ray photon and the emission direction of the first x-ray photon is about parallel to the emission direction of the second x-ray photon.

19. The system of claim 18, wherein the first tip material and the second tip material are selected from a group consisting of aluminum, gold, copper, titanium, tungsten, silver, molybdenum, rhodium, argon, or krypton, and the first tip material is different to the second tip material.

20. The system of claim 18, wherein the first tip material is located on a first hollow truncated cone with a sidewall forming a lateral surface of the first hollow truncated cone, the sidewall directs the first photon in the laser beam on to the base of the first tip material; and wherein the second tip material is located on a second hollow truncated cone with a sidewall forming a lateral surface of the second hollow truncated cone, the sidewall directs the second photon in the laser beam on to the base of the second tip material, the first hollow truncated cone and the second hollow truncated cone are co-located on a common support.

\* \* \* \* \*